(12) United States Patent
Chen et al.

(10) Patent No.: US 8,537,532 B2
(45) Date of Patent: Sep. 17, 2013

(54) ALL-IN-ONE COMPUTER

(75) Inventors: Ching-Jou Chen, New Taipei (TW);
Chin-Ming Chen, New Taipei (TW);
Wen-Chieh Wang, New Taipei (TW);
Yu-Ming Chen, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 102 days.

(21) Appl. No.: 13/198,732

(22) Filed: Aug. 5, 2011

(65) Prior Publication Data
US 2012/0314360 A1 Dec. 13, 2012

(30) Foreign Application Priority Data

Jun. 7, 2011 (TW) .................................. 100119786

(51) Int. Cl.
*G06F 1/16* (2006.01)
*A47B 81/00* (2006.01)

(52) U.S. Cl.
USPC .............. 361/679.21; 361/679.29; 312/223.2; 248/917

(58) Field of Classification Search
USPC ............ 361/679.01–679.45, 679.55–679.59; 248/917–924; 312/223.1, 223.2
See application file for complete search history.

(56) References Cited

U.S. PATENT DOCUMENTS

| | | | | |
|---|---|---|---|---|
| 7,471,511 B2 * | 12/2008 | Montag et al. | ........... | 361/679.41 |
| 7,656,652 B2 * | 2/2010 | Moser | ........... | 361/679.27 |
| 8,264,829 B2 * | 9/2012 | Moser | ........... | 361/679.29 |
| 2004/0057197 A1 * | 3/2004 | Hill et al. | ........... | 361/683 |
| 2004/0190234 A1 * | 9/2004 | Lin et al. | ........... | 361/681 |
| 2005/0057896 A1 * | 3/2005 | Homer | ........... | 361/686 |
| 2005/0111182 A1 * | 5/2005 | Lin et al. | ........... | 361/686 |
| 2005/0128693 A1 * | 6/2005 | Itoh et al. | ........... | 361/683 |
| 2008/0266767 A1 * | 10/2008 | Nicholas et al. | ........... | 361/681 |
| 2012/0106060 A1 * | 5/2012 | Probst et al. | ........... | 361/679.09 |

\* cited by examiner

*Primary Examiner* — Jayprakash N Gandhi
*Assistant Examiner* — Nidhi Desai
(74) *Attorney, Agent, or Firm* — Altis Law Group, Inc.

(57) ABSTRACT

An all-in-one computer includes a main body and a display. The main body includes a first locking structure, a first connector, and a second connector. The display includes a second locking structure detachably engaging with the first locking structure, a third connector connecting to the first connector, and a fourth connector connecting to the second connector. The second locking structure engages with the first locking structure to connect the display to the main body.

3 Claims, 4 Drawing Sheets

ALL-IN-ONE COMPUTER

BACKGROUND

1. Technical Field

The present disclosure relates to computers and, particularly, to an all-in-one computer.

2. Description of Related Art

All-in-one computers include a main body and a display, which are integrated together by a case to improve compactness and portability of the computers. However, the replacement and/or repair of the display and the main body can be difficult because the display and the main body cannot be detached from the computer.

Therefore, it is desirable to provide an all-in-one computer to overcome the above mentioned limitations.

BRIEF DESCRIPTION OF THE DRAWINGS

Many aspects of the present disclosure should be better understood with reference to the following drawings.

DETAILED DESCRIPTION

Embodiments of the present disclosure will now be described in detail with reference to the drawings.

Figure 1:
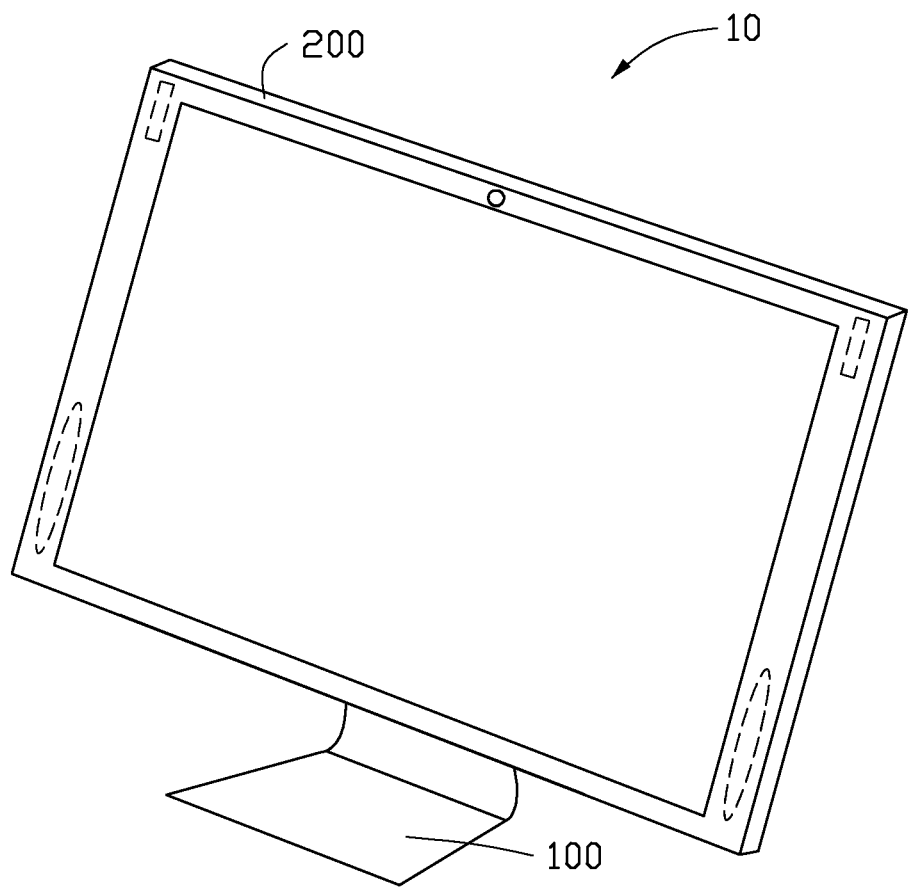
FIG. 1 is a schematic view of an all-in-one computer, in accordance with a first embodiment.

Referring to FIG. 1, an all-in-one computer 10, according to a first embodiment, includes a main body 100 and a display 200.

Figure 2:
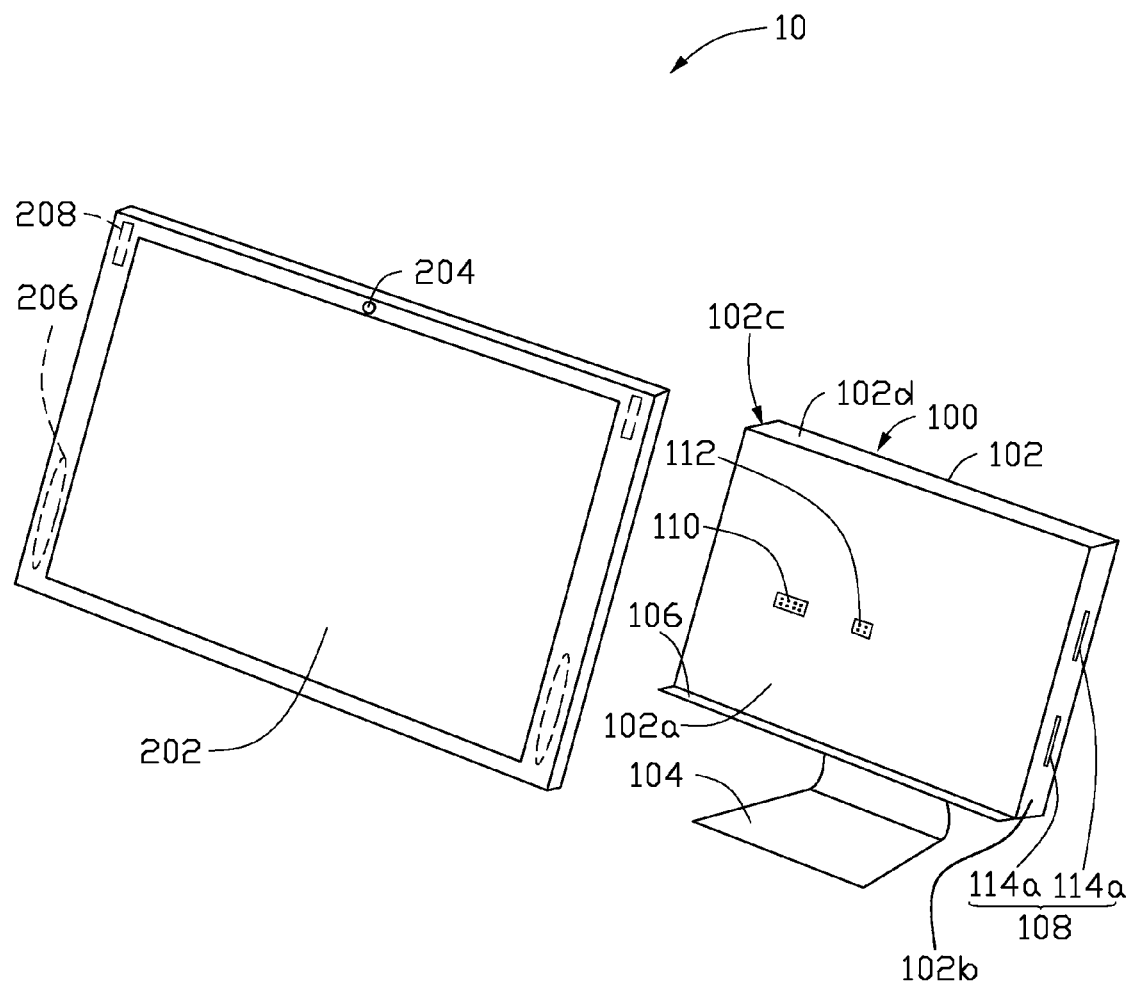
FIG. 2 is an exploded view of the all-in-one computer of FIG. 1.
Figure 3:
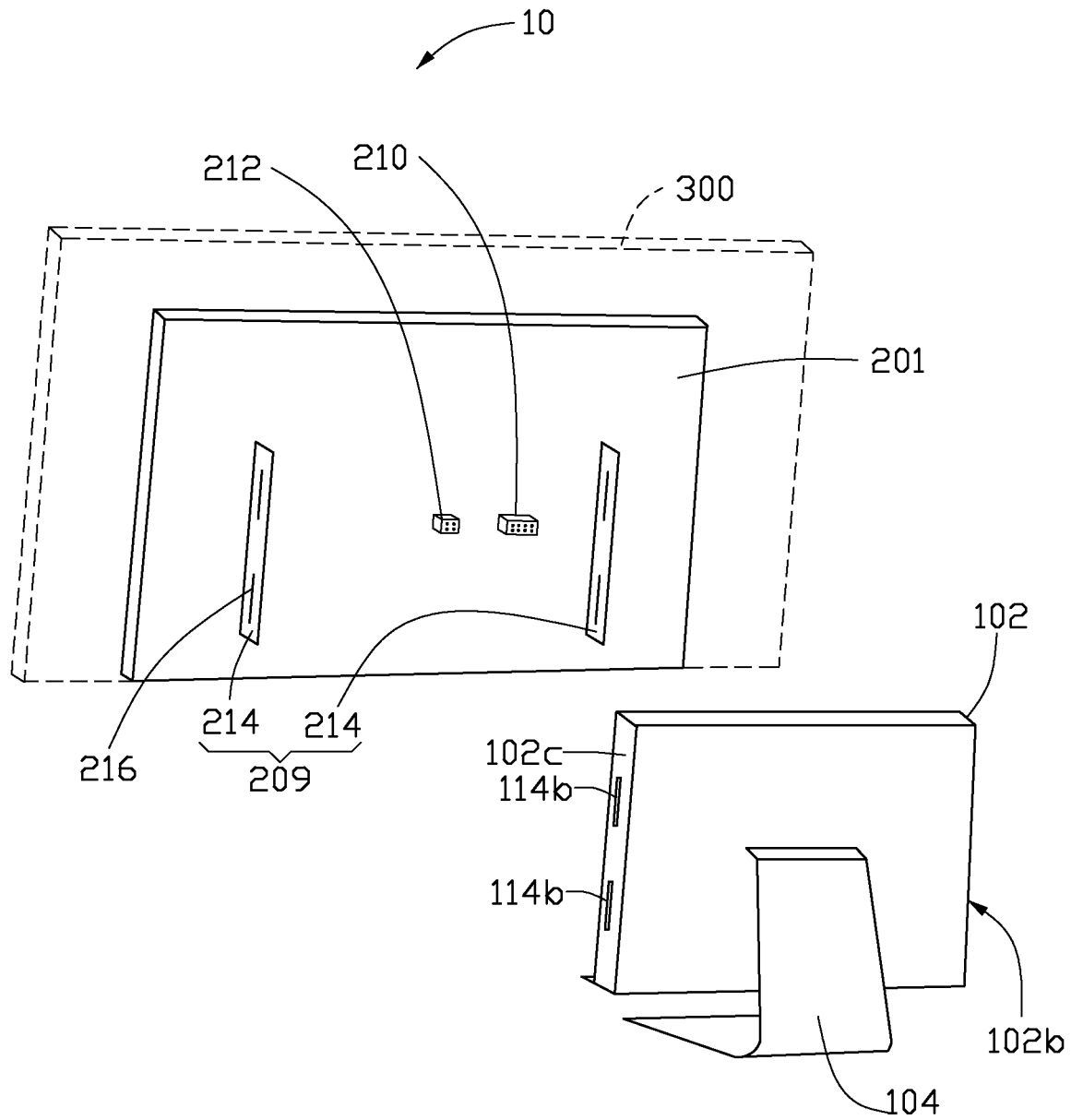
FIG. 3 is an exploded view of the all-in-one computer of FIG. 1, viewed at another angle.
Figure 4:
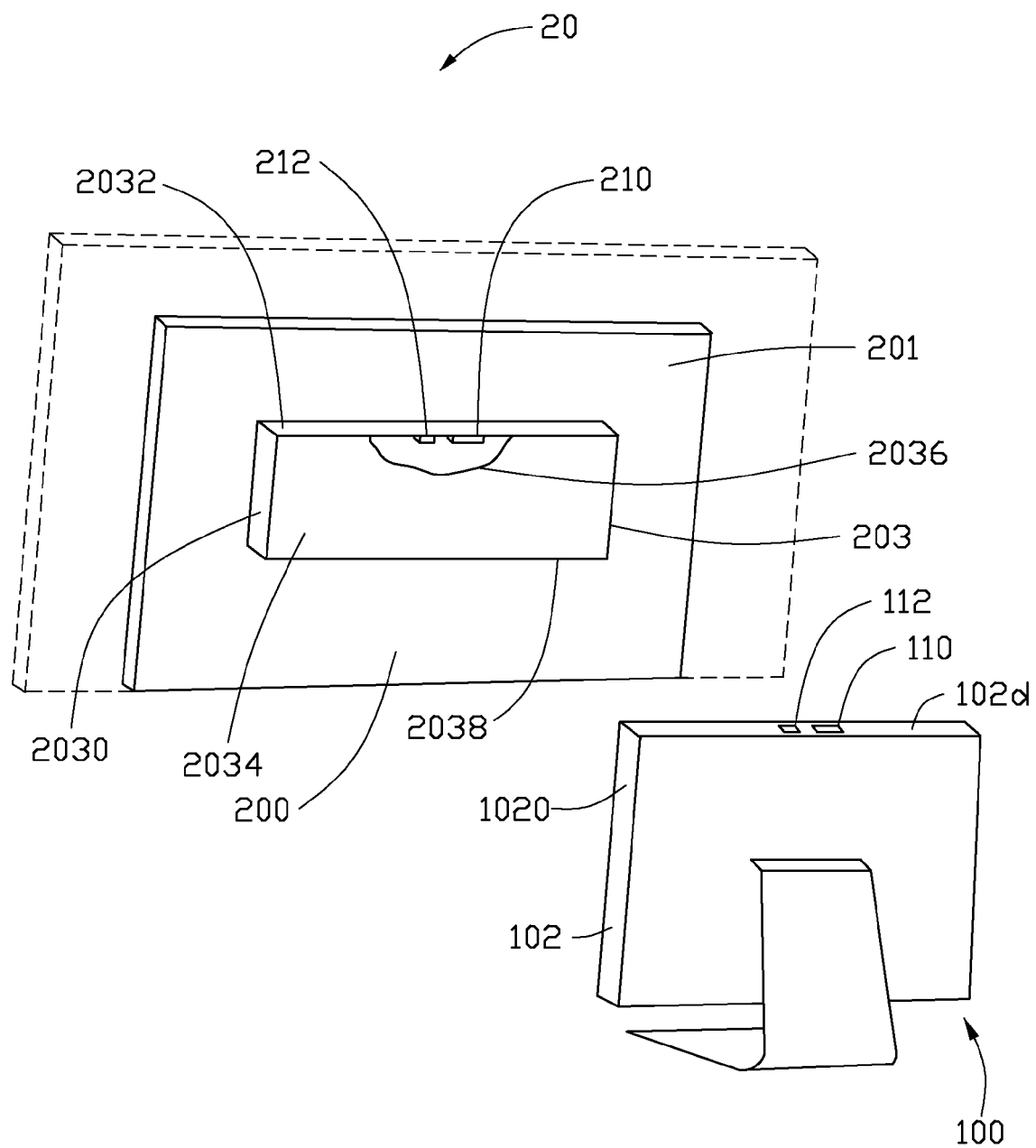
FIG. 4 is a schematic exploded view of an all-in-one computer in accordance with a second embodiment.

Referring to FIGS. 2 and 3, the main body 100 includes a rectangular shell 102 and a base 104 for supporting the shell 102. The shell 102 includes a first assembly surface 102a, a first side surface 102b, a second side surface 102c, and a top surface 102d. The first side surface 102b and the second side surface 102c are perpendicularly connected to two opposing sides of the first assembly surface 102a. The top surface 102d is perpendicularly connected to a side of the first assembly surface 102a away from the base 104. The main body 100 also includes a holding plate 106, a first locking structure 108, a first connector 110, and a second connector 112. The holding plate 106 protrudes from a side of the first assembly surface 102a that is close to the base 104. The first locking structure 108 includes two first protrusions 114a extending from the first side surface 102b and two second protrusions 114b protruding from the second side surface 102c. The first connector 110 and the second connector 112 are arranged on the first assembly surface 102a.

The display 200 includes a second assembly surface 201 corresponding to the first assembly surface 102a, a screen 202 facing away the second assembly surface 201, a camera 204 arranged on the top of the screen 202, two speakers 206, and two antennas 208. The two speakers 206 and the two antennas 208 are arranged on the periphery of the screen 202. The display 200 also includes a second locking structure 209 arranged on the second assembly surface 201, a third connector 210 corresponding to the first connector 110, and a fourth connector 212 corresponding to the second connector 112. The second locking structure 209 includes two locking plates 214 protruding from the second assembly surface 201. The two locking plate 214 are parallel to each other and the distance therebetween corresponds to that between the first side surface 102b and the second side surface 102c. Each of the locking plate 214 defines two through holes 216 that correspond to the two first protrusions 114a and the two second protrusions 114b. The outward length of the locking plates 214 from the second assembly surface 201 is greater than that of the third connector 210 and the fourth connector 212.

In assembly, the second assembly surface 201 faces to the first assembly surface 102a. The two locking plates 214 abut against the first side surface 102b and the second side surface 102c. Then the display 200 is pushed towards the shell 102. The first protrusions 114a and the second protrusions 114b force the two locking plates 214 to move away from each other and then slide into the corresponding through holes 216. As such, the first locking structure 108 engages with the second locking structure 209. At the same time, the first connector 110 connects with the third connector 210 and the second connector 112 connects with the fourth connector 212. The display 200 is held on the holding plate 106.

In operation, the first connector 110 and the third connector 210 transmit display signals that are displayed on the display 202, while the second connector 112 and the fourth connector 212 transmit audio signals of the speakers 206, antenna signals of the antenna 208, and video signals of the camera 204. As the transmission rate of the display signals is much greater than that of the audio signals, the antenna signals, and the video signals, separating the transition of the display signals from other signals reduces interferences and thereby improving the quality of the all-in-one computer 10.

To disassemble, the first protrusions 114a and the second protrusions 114b are forced to disengage from the through holes 216. As such, the display 200 is conveniently disassembled from the main body 100. Furthermore, when a user wants to change the size of the display 200, such as a second display 300 having a larger screen, the user can conveniently assemble the second display 300 to the main body 100. In other embodiments, the holding plate 106 can be omitted as the first locking structure 108 engages with the second locking structure 209 to firmly hold the display 200.

Referring to FIG. 3, an all-in-one computer 20, according to a second embodiment is shown. In comparison to the all-in-one computer 10, in the all-in-one computer 20, the holding plate 106 and the protrusions 114a, 114b of the main body 100 are omitted. Also the first connector 110 and the second connector 112 are arranged on the top surface 102d, the locking plates 214 of the display 200 are omitted, the display 200 includes a cover 203 on the second assembly surface 201 for engaging with a top part 1020 of the shell 102.

In detail, the cover 203 is substantially rectangular-shaped and includes two limiting plates 2030, a top plate 2032 and a back plate 2034. The two limiting plates 2030 extend from the second assembly surface 201 and are parallel to each other. The top plate 2032 protrudes from the second assembly surface 201 and connects to the two limiting plates 2030. The back plate 2034 is perpendicularly connected to the two limiting plates 2030 and the top plate 2032. The cover 203 forms a receiving room 2036 defined between the second assembly surface 201, the limiting plates 2030, the top plate 2032, and the back plate 2034. The receiving room 2036 is for housing the top part 1020 of the shell 102. The receiving room 2036 defines an opening 2038 that communicates to the receiving room 2036. The third connector 210 and the fourth connector 212 are arranged on the top plate 2032, both facing the opening 2038. As such, when assembling the display 200 to the main body 100, the user only needs to cover the cover 203 onto the top part 1020 so that the first connector 110 is connected to the third connector 210. Additionally, the second connector 112 is connected to the fourth connector 212 when the top surface 102*d* abuts against the top plate 2032.

It will be understood that the above particular embodiments is shown and described by way of illustration only. The principles and the features of the present disclosure may be employed in various and numerous embodiment thereof without departing from the scope of the disclosure as claimed. The above-described embodiments illustrate the scope of the disclosure but do not restrict the scope of the disclosure.

What is claimed is:

1. An all-in-one computer, comprising: a main body, the main body comprising: a first locking structure; a first connector; and a second connector; and a display, the display comprising: a second locking structure detachably engaged with the first locking structure, a third connector connecting to the first connector; and a fourth connector connecting to the second connector; wherein the main body comprises a shell, the shell comprises a first assembly surface, a first side surface connected to a side of the first assembly surface, and a second side surface connected to another side of the first assembly surface and facing to the first side surface, the first locking structure comprises at least a first protrusion protruding from the first side surface and at least a second protrusion protruding from the second side surface, the first connector and the second connector are arranged on the first assembly surface; the display comprises a second assembly surface facing to the first assembly surface, the second locking structure comprises two locking plates protruding from the second assembly surface, the two locking plates are parallel to each other and the distance between the two locking plates corresponds to that between the first side surface and the second side surface, each locking plate comprises at least a through hole, each of the at least a first protrusion and the at least a second protrusion engages with a corresponding through hole, the third connector and the fourth connector are arranged on the second assembly surface; wherein the main body comprises a holding plate protruding from a bottom side of the first assembly surface, the holding plate holds the display.

2. The computer of claim 1, wherein the display comprises a screen facing away the second assembly surface, a camera arranged on the top of the screen, at least a speaker and at least a antenna arranged, the at least a speaker and the at least a antenna are arranged around the screen.

3. The computer of claim 1, wherein the outward length of each locking plate from the second assembly surface is greater than that of the third connector and the fourth connector.

* * * * *